United States Patent [19]
Lockwood et al.

[11] 3,838,392
[45] Sept. 24, 1974

[54] AUDIBLE WARNING SYSTEM FOR SCHOOL BUSES

[75] Inventors: John E. Lockwood, Hamilton Square; Herbert S. Spair, Robbinsville; Richard A. Spair, Sr., Hamilton Square, all of N.J.

[73] Assignees: Richard A. Spair, Sr.; John E. Lockwood, both of Hamilton Square; Herbert S. Spair, Robbinsville, all of, N.J. ; part interest to each

[22] Filed: July 5, 1973

[21] Appl. No.: 376,698

[52] U.S. Cl. .............................................. 340/75
[51] Int. Cl. ........................... B60q 5/00, B60q 1/26
[58] Field of Search ................ 340/75, 52 R; 315/77

[56] References Cited
UNITED STATES PATENTS

| | | | |
|---|---|---|---|
| 3,564,497 | 2/1971 | Gazzo | 340/75 |
| 3,744,022 | 7/1973 | Olsen | 340/52 R |

*Primary Examiner*—Donald J. Yusko
*Attorney, Agent, or Firm*—Sperry and Zoda

[57] ABSTRACT

Combined with an already known electrical circuit used in school buses to activate flashing yellow and red lights, the present invention provides an audible warning to children who have alighted from the bus. The audible warning system is automatically activated in response to closing of the door of the bus preparatory to movement of the bus away from the stop, sounding a clearly audible warning, preferably at the front and rear of the bus, for a time period sufficient to warn the children away from the bus until it is safely on its way, and has put enough distance between the bus and the children to prevent their injury. The system employs a transistorized circuit in which power supplied to a buzzer or other audible alarm device is controlled by one or more transistors, in association with a capacitor.

As the school bus nears a bus stop, the operator activates a yellow warning light system, which changes automatically to a red light warning system while the bus is stopped. Upon opening of the school bus door, the capacitor is short-circuited and discharged, in a circuit configuration that withholds current from the audible alarm device. On closing of the door, the capacitor prevents the transistor from conducting during the time required to charge the capacitor, and in this predetermined time period the buzzer or other alarm device is caused to operate in response to rendering the transistor non-conductive while the capacitor is again being charged.

4 Claims, 1 Drawing Figure

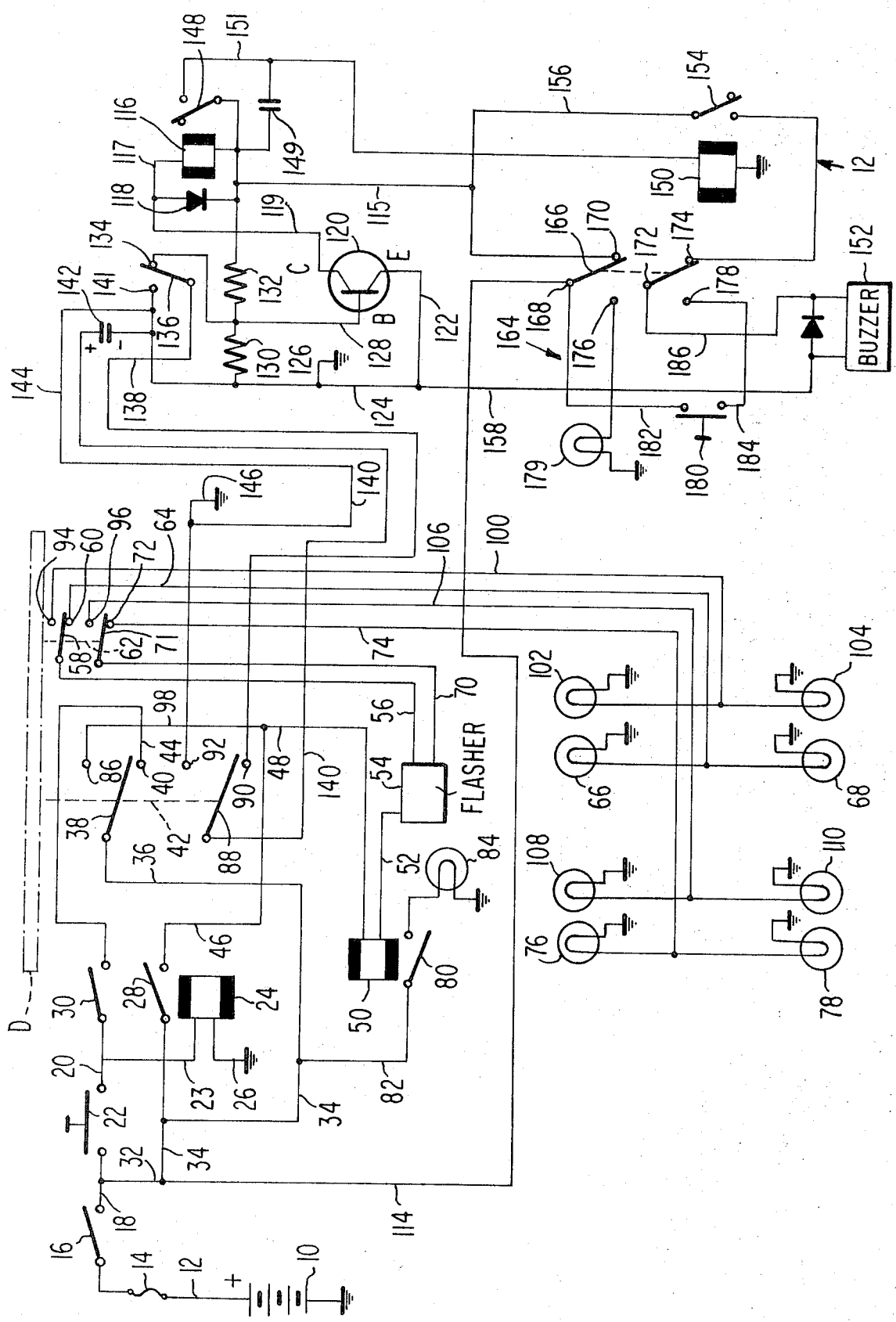

AUDIBLE WARNING SYSTEM FOR SCHOOL BUSES

BACKGROUND OF THE INVENTION

1. Field of the Invention

The invention is in the field of electrical communications, in general, and more specifically is a communication system used in vehicles. Even more particularly, the system is one in which activation of an audible alarm is responsive automatically to first the opening, and then the closing, of a vehicle door.

2. Description of the Prior Art

The prior art as heretofore known to applicant includes such patents as the following: Beauchemin U.S. Pat. No. 2,673,974; Gordon U.S. Pat. No. 2,775,751; Webster U.S. Pat. No. 2,870,428; Coombs U.S. Pat. No. 3,109,158; Murphy U.S. Pat. No. 3,221,211; Rossi U.S. Pat. No. 3,182,289; Kratochvil U.S. Pat. No. 3,444,513.

The prior art as known to applicant fails to suggest an audible warning system for school buses operable precisely under the conditions in which such operation is of maximum value. Systems have been heretofore divised incorporating lights, as the school bus nears a stop and, of course, while the bus is actually stopped and is loading or unloading school children. However, conventionally, when the school bus door closes and the bus moves away from the stop, the flashing red and yellow warning light system is deactivated substantially simultaneously with closure of the school bus door, release of pressure on the foot brake, and acceleration of the bus from the stop.

This is clearly undesirable. Many accidents having occurred in the past, and are obviously likely to reoccur, resulting from the fact that children, after alighting from the bus, do not exercise care to stay clear of the bus as it begins to move away from the stop. Often, naturally active and excited, they engage in conversation with their schoolmates after alighting from the bus, or may be running or playing close to the bus as it pulls away. It is not uncommon for the child, under these circumstances, to slip under the wheels of the bus and be seriously injured or killed as the bus leaves the stop.

The problem here is to provide a clear, audible warning to all the children who have alighted, making them fully aware that the bus is about to leave and that they should keep their distance for their own personal safety, and it is important that the warning be sounded automatically, starting at a precise point in time when the school bus door closes, and continuing until the bus is out of range of the children who have just gotten off.

SUMMARY OF THE INVENTION

The invention, summarized briefly, incorporates circuitry, connected directly with a system already known and shown to particular advantage in Rossi U.S. Pat. No. 3,182,289 listed above. That system is a warning light control system, in which the bus driver manually activates a flashing amber light circuit as the school bus nears a stop, the system automatically changing over to a flashing red light arrangement when the bus is fully stopped. In accordance with the present invention, the audible warning system supplements the amber and red light systems, in that the audible system takes over when the light system is deactivated, utilizing a substantial portion of the same circuitry as is used in the warning light system.

The present invention utilizes a transistor, controlling power to an audible alarm, and in turn controlled by a capacitor.

As previously indicated, the alarm sounds for a given time period, equal to the time required to recharge the capacitor. The capacitor, thus, becomes charged in a given time period, determined according to the value of the capacitor selected for inclusion in the circuit. The capacitor is thus fully charged, and the transistor is again fully conductive, while the bus is on its way to the next bus stop. With the transistor conductive, relay means is operative to prevent power from being supplied to the alarm device. When the bus arrives at the next stop, opening of the door discharges the capacitor, a circumstance which causes sounding of the alarm device by reason of the fact that on closing of the door, the non-conducting condition of the transistor causes the relay to be operative to sound the alarm, while the capacitor is recharging during movement of the bus away from the stop.

BRIEF DESCRIPTION OF THE DRAWING

The single FIGURE of the drawing is a wiring diagram of the combined circuit, including the circuit constituting the present invention, in association with a circuit incorporating successively energized amber and red light warning means.

DESCRIPTION OF THE PREFERRED EMBODIMENT

The reference numeral 10 designates a vehicle battery from the positive terminal of which extends a lead 12 in which is connected a fuse 14. A single pole, maintained switch 16 is preferably mounted in the instrument panel of the vehicle, and when closed by the user activates the entire system.

With switch 16 closed, current may flow from the battery 10 through lead 18 to lead 20, whenever a normally open, footoperated switch 22 is depressed and hence closed by the bus operator. This permits current to flow through lead 23 to a relay 24, and return to the battery 10 through ground 26.

Energization of relay 24 causes contacts 28, 30, both of which are normally open, to close.

The bus operator would depress foot switch 22 while preparing to bring the bus to a stop with the bus door D closed. All that is required is for the operator to momentarily close switch 22, thereafter releasing the pressure on the switch as soon as the switch contacts are bridged. The resultant energizing of relay 24 and the consequent closure of relay contacts 28, 30, causes the relay 24 to "lock", that is remain energized despite the immediate opening of the switch 22.

This results by reason of the fact that with contacts 30 closed, current will flow from lead 18, through a lead 32, lead 34, lead 36, contacts 38, 40 of a DPDT switch 42 operated by door D, lead 44, closed relay contacts 30, lead 23, the winding of relay 24, and return to the battery through ground 26.

With contacts 28 thus held closed despite the opening of switch 22, current will flow through lead 32, closed contacts 28, lead 46, lead 48, the winding of relay 50, lead 52, flasher 54, lead 56, contacts 58, 60 of a DPDT switch 62 operated by door D, lead 64, amber lights 66, 68 provided upon the front and rear, respectively, of the vehicle, and return to the source of energy through ground. Current also flows from the flasher through lead 70, contacts 71, 72 of switch 62, lead 74, amber lights 76, 78 provided upon the front and rear of the vehicle, and return to the energy source through ground.

When the winding of relay 50 was energized, relay contacts 80 were closed thereby, causing current to flow from lead 34 through lead 82, closed contacts 80, a pilot light 84 mounted upon the instrument panel of the vehicle, and return to the source of energy through ground.

It will be understood that the amber lights 76, 66 at the front of the vehicle would be left and right signals, with lights 78, 68 being left and right rear signals.

When the vehicle comes completely to a stop, and the bus operator opens the door D, the depressed plunger of switch 62 is freed, and extends to operate the contacts 58, 71 to their opposite extreme positions. As a result, current to the amber lights is cut off, and now flows to the red lights provided at the front and rear of the vehicle, continuing to do so until the door D is again closed preparatory to movement of the vehicle from the bus stop.

In these circumstances, the plunger of switch 42 extends substantially simultaneously with extension of plunger of switch 62, so that contact 38 connects lead 36 to a switch contact 86, simultaneously with movement of the second movable contact 88 of switch 42, from stationary switch contact 90 to contact 92.

At the same time, contacts 58, 71 will have moved into engagement with stationary switch contacts 94, 96 of switch 62.

This opens the relay holding circuit previously closed through relay contacts 30 and the winding of relay 24. Accordingly, relay winding 24 is de-energized simultaneously with opening of the door D as the bus comes to a stop, and contacts 28, 30 of this relay are accordingly permitted to return to their normally open position.

At the same time, current flows from the source of current as follows: lead 12, closed main switch 16, lead 32, lead 34, lead 36, switch contacts 38, 86, lead 98, lead 48, winding of relay 50, flasher 54, lead 56, switch contacts 58, 94, lead 100 to right front and right rear red lights 102, 104.

Also current flows from flasher 54 through lead 70, switch contacts 71, 96, lead 106, left front and rear red lights 108, 110 and return to the energy source through ground.

The red lights thus flash as long as the door is open with the bus loading or unloading children at the stop.

As soon as the door D is closed, switches 62, 42 are again operated to the positions shown in the drawing. As a result, the entire system of amber and red lights reverts to its standby condition, ready for the next operation in response to depression of foot switch 22 to a closed position as the bus nears the next stop.

The foregoing does not, in and of itself, constitute part of the present invention, constituting the circuit and operating sequence as shown in Rossi U.S. Pat. No. 3,182,289.

In the Rossi Patent, switch contacts 88, 90, 92 do not exist, and are added in accordance with the present invention.

The circuitry compirsing the present invention coacts with the hereinbefore described circuitry. The circuit of the present invention operates to sound, immediately upon closing of the door preparatory to movement of the bus from the stop, an audible alarm, to warn children away from the bus as it moves away. This alarm starts to sound automatically, immediately upon closing of the door, and then continues for a specified time period, at which time it shuts off, also automatically. The alarm circuit comprising the present invention has been generally designated 112.

The alarm circuit 112 is arranged to produce sounding of loud buzzers or other audible alarm devices at the front and rear of the bus, as soon as the door has been closed, to warn the children as it goes into motion, sometimes even to the extent of having to back up to clear an obstacle in front of it.

To this end, the circuit 112 includes a power lead 114, connected to the positive terminal of battery 10 through the interposed main switch 16. Lead 114 is connected to one terminal of the winding of relay 116, to the other terminal of which is connected lead 117. In shunt with relay winding 116 is a blocking diode 118.

Connected to lead 117 is lead 119 extending to the collector of NPN transistor 120. Lead 122 is connected to the emitter of said transistor, and is connected by lead 124 to ground 126.

Lead 128 is connected to the base of the transistor, extending to junction between resistors 130, 132. In the preferred embodiment, 132 is a 51,000 ohm, 1 watt resistor while 130 is a 10,000 ohm, 1 watt resistor.

Also connected to the junction of resistors 130, 132 is stationary contact 134 of manually operated SPDT switch having movable contact 136 connected to lead 138, which extends to stationary contact 90 of switch 42. With door D closed, movable contact 88 of said switch 42 is engaged with contact 90, and connected to said contact 88 is lead 140 extending to positive terminal of a capacitor 142, which in a preferred embodiment is of 1,000 mfd., 25 volt value.

Switch 134 is readily accessible to the driver. When and if the driver considers it necessary to operate it, he does so by a push button, foot treadle, or a toggle handle, to engage contacts 134, 141. On release, the switch immediately reverts to its normal position shown.

The negative terminal of said capacitor 142 is connected to lead 144 extending to contact 92 of switch 42, and also connected to ground as at 146.

Considering the operation to this point, let it be assumed that the bus has moved away from a stop, and that the audible alarm has terminated while the bus is enroute to the next stop.

Since the capacitor was discharged on operation of the audible alarm, it must now charge up to a point at which the transistor will again conduct. Preferably, this is selected to occur at a point in time before the capacitor is fully charged. As previously noted, the base of the transistor is connected to the junction between resistors 130, 132. Also connected to said junction is the positive terminal of capacitor 142.

As a result, the transistor is rendered non-conducting, until the capacitor charges up to the conducting value of the transistor at the base emitter junction. This occurs over a time period determined by the value of the capacitor, the value being selected to assure that the capacitor will charge during the normal period of time that a bus is enroute between stops.

Accordingly, the transistor again begins to conduct while the bus is in motion enroute to its next stop.

As soon as the capacitor charges up to the conducting value of the transistor, the transistor conducts, and current flows between the emitter and the collector thereof, producing flow as follows: negative terminal of battery 10, ground 126, lead 124, lead 122, from emitter to collector of transistor 120, lead 119, lead 117, relay winding 116, lead 115, lead 114, lead 18, switch 16, lead 12, positive terminal of battery 10.

The energizing of relay winding 116 causes its contacts 148 to be opened. There is, accordingly, no flow of current to relay 150. Relay 116, it may be noted, is in a preferred embodiment, a relay rated at 5 ma, 1760 ohms (winding) and 3 amp. (contacts). Relay 150 is a 20-ampere (contact value), 12 volt relay.

At this time, also, the audible alarm or buzzer 152 (there may be any number of these connected in parallel) is deactivated, because with relay 150 de-energized, its contacts 154 are open preventing completion of a circuit through the buzzer.

Assume now that the bus comes to a stop. Preliminary to stopping, the vehicle operator, by momentary depression of switch 22 to close the same, causes the amber lights to begin flashing in the manner previously described and also described in the Rossi U.S. Pat. No. 3,182,289. The bus now comes to a stop, and upon opening of the door, the amber lights go off and the red lights begin to flash and remain on as long as the door is open to cause traffic to come to a stop while the bus is loading or unloading.

As soon as the door opens, the capacitor 142 is shorted and hence discharged. This happens because opening of the door causes movable contact 88 of switch 42 to break with contact 90 and make with contact 92. Accordingly, the capacitor is discharged because its positive terminal is connected to ground as at 146.

Relay winding 116 remains energized at this time, so that no current flows through the alarm device 152.

Assume now that the door D is closed preparatory to movement of the bus away from the stop. Under these circumstances, there is a blockage of current through the transistor while the capacitor is being re-charged up to the point at which the transistor will again begin to conduct. As a result, relay winding 116 is de-energized, and contacts 148 operate to provide a connection between lead 115 and lead 151 extending to one terminal of relay winding 150. Relay winding 150 is thus energized, by current flowing through power lead 114, lead 115, relay contacts 148, lead 151, relay winding 150 and return to the source of energy through ground. This causes contact 154 to be operated to close a circuit from power lead 114, through lead 156, relay contacts 154, alarm 152, lead 158, lead 124 and return to the source of energy through ground 126.

Connected between relay winding 116 and lead 151, in shunt across contacts 148, in a capacitor 149.

The audible alarm continues to sound for a few seconds, while the capacitor is charging up to the predetermined point at which the conductive value of the transistor is reached. As soon as the capacitor charges up to the conductive value of the transistor, the transistor is rendered conductive once again, and once again the relay winding 116 is energized, to interrupt the flow of 12 volt power to relay 150, hence deactivating the buzzer 152. The device is thus once again in a standby condition, awaiting its next use when the bus comes to the next stop at which it loads or unloads passengers.

Means is provided to operate the buzzer manually, by a simple circuit directly from the source of electrical energy, in the event that there is a malfunction in the automatic circuit hereinbefore described.

To this end, there is provided an auxiliary circuit generally designated 164. This includes a DPDT switch 166, which may be a manually operated toggle switch mounted upon the instrument panel of the vehicle.

When the system is automatically operating, switch 166 is in the position shown in the drawing. At this time, power from the 12 volt battery positive terminal flows through lead 114 and through closed contacts 168, 170 of switch 166, to the junction between the power lead 114 and the leads 116, 156.

Also, when the system is in automatic operation, power flows through closed contacts 172, 174 of the switch 166, to the audible alarm device 152, and return to the power source through ground 126 as previously described herein.

If it is desired to put the alarm device on manual operation, the bus operator throws the switch 166, so as to close contacts 168, 176 of the switch, and also contacts 172, 178 thereof. As a result, the entire automatic alarm system is deactivated. In these circumstances, power continuously flows through lead 114 (assuming that master switch 16 is closed), closed contacts 168, 176, supplying power continuously to a pilot light 179 connected also to ground, so that whenever the device is on "manual", the pilot light 179, which will be on the instrument panel, will be illuminated as a reminder to the bus operator that manual operation is required to activate the alarm each time the bus pulls away from a stop.

With contacts 168, 176 closed and contacts 172, 178 also closed, not only is the pilot light continuously illuminated, but also the alarm buzzer will sound each time the bus operator depresses a foot switch 180. Switch 180 has one of its stationary contacts connected to terminal 168 by lead 182, and the other stationary contact connected to terminal 178 by a lead 184. Accordingly, with the device on "manual", the bus operator would depress switch 180 when closing the door D preparatory to moving away from the stop and would hold switch 180 in a closed position for as long as it is desired to sound the alarm 152. Power is supplied directly to alarm 152 in these circumstances from power lead 114, lead 182, closed switch 180, lead 184, contacts 178, 172, and lead 186 to the positive terminal of alarm 152, thereafter returning to the battery through leads 158, 124 and ground 126.

Means is also provided to cycle the buzzer circuit automatically at the driver's option, in the same manner as it is cycled in response to closing of the door. For example, let it be assumed that the door has closed and the alarm has been automatically sounded for the prescribed few seconds preliminary to the movement of the bus away from the bus stop, all as previously described herein. In these circumstances, the operator may note that one or more children have ignored the alarm and are still in position to be injured as the bus pulls away.

By momentarily throwing the switch 134 into engagement with contact 141, the operator puts the circuit through an automatic alarm-sounding cycle with the door closed, just as though the door were opened and then closed to activate the circuit automatically in the manner previously described.

The momentary closing of contacts 134, 141 discharges the capacitor even though the school bus door is closed and has not been reopened. It does so by closing a circuit between the positive terminal of the capacitor and ground as follows: The positive terminal of the capacitor, lead 140, contacts 88, 90 of door switch 42, lead 138, contacts 136, 141, lead 144, to ground 146.

In this way, the door closing switch 42 is bypassed in that the capacitor is discharged without requirement of closing contacts 88, 92 thereof. The discharge of the capacitor then operates to cycle the alarm circuit automatically in the manner previously described herein to alert the children. The driver can cycle the alarm circuit automatically again and again in this way without leaving the bus stop and without opening the door.

We claim:

1. The conbination, with circuitry for energizing a warning light system when a vehicle is being brought to a stop and while it is stopped, of an audible alarm system designed for operation when the vehicle is in its initial movement away from said stop, said circuitry incorporating switch means responding to opening and closing of the door to control the energizing of said lights, said system including a capacitor; electrical current flow control means in circuit with the capacitor; an alarm device; and a source of electrical power, said switch means being effective when the door is opened to discharge the capacitor, and being effective when the door is closed to recharge the capacitor to a predetermined value over a given time period, the capacitor being operative, while being recharged to said value, to temporarily change the electrical condition of the current flow control means, said current flow control means in turn being effective, while in its changed condition, to permit the flow of power from said source to the alarm device.

2. A warning system as in claim 1, wherein the current flow control means is a transistor normally conductive at all times except when the capacitor is being recharged, the capacitor being connected to the transistor and being effective to render the transistor nonconductive while the capacitor is being recharged, said transistor permitting the flow of power to the alarm device only in the non-conductive condition of the transistor.

3. An audible, electrical warning system as in claim 1, further including an auxiliary circuit connected in said system and including a manual switch operative to deactivate the capacitor and said current flow control means, said auxiliary system providing a connection directly from the source of electrical power to said alarm device and including a normally open switch adapted for manual operation by the vehicle operator.

4. An audible, electrical warning system as in claim 1, further including a manually operable switch connected in said system for actuation by the vehicle operator between a passive position in which it permits the flow of power from the power source to the alarm device responsive to opening and closing of the door, and an active position in which, with the door closed, it assumes the functions normally discharged by said switch means in response to opening and closing of the door.

* * * * *